United States Patent
Aoki

(10) Patent No.: US 9,659,117 B2
(45) Date of Patent: May 23, 2017

(54) DEFORMATION STATE ANALYSIS METHOD, RESIN MOLDED ARTICLE DEFORMATION IMPROVEMENT METHOD, AND RESIN MOLDED ARTICLE WEIGHT REDUCTION METHOD

(75) Inventor: Gen Aoki, Fuji (JP)

(73) Assignees: POLYPLASTICS CO., LTD., Tokyo (JP); GEN AOKI, Fuji-Shi (JP)

(\*) Notice: Subject to any disclaimer, the term of this patent is extended or adjusted under 35 U.S.C. 154(b) by 547 days.

(21) Appl. No.: 14/348,478

(22) PCT Filed: Aug. 2, 2012

(86) PCT No.: PCT/JP2012/069740
§ 371 (c)(1),
(2), (4) Date: May 15, 2014

(87) PCT Pub. No.: WO2013/046920
PCT Pub. Date: Apr. 4, 2013

(65) Prior Publication Data
US 2015/0005916 A1  Jan. 1, 2015

(30) Foreign Application Priority Data
Sep. 29, 2011  (JP) ................. 2011-214664

(51) Int. Cl.
*G06F 17/50* (2006.01)
*B29C 45/76* (2006.01)

(52) U.S. Cl.
CPC ...... *G06F 17/5018* (2013.01); *B29C 45/7693* (2013.01); *G06F 17/50* (2013.01); *G06F 2217/41* (2013.01)

(58) Field of Classification Search
CPC  G06F 17/50; G06F 2217/41; B29C 45/76693
See application file for complete search history.

(56) References Cited

U.S. PATENT DOCUMENTS

2005/0082706 A1\*  4/2005  Nagaoka ............. B29C 33/3835
264/40.1
2009/0304970 A1\*  12/2009  Imaizumi .............. B29C 45/062
428/38

FOREIGN PATENT DOCUMENTS

JP  H10138310 A  \*  5/1998  ......... B29C 33/3835
JP  2004-167686 A  6/2004
(Continued)

OTHER PUBLICATIONS

First Office Action issued to CN Application No. 201280047377.1, mailed Sep. 25, 2014.
(Continued)

*Primary Examiner* — Charles E Anya
(74) *Attorney, Agent, or Firm* — Knobbe Martens Olson & Bear LLP

(57) ABSTRACT

There is provided an analysis method whereby, when a proposed plan for deforming a resin molded article is created, it is possible to create a more effective proposed plan in a short time. In an deformation state analysis method of analyzing, for a resin molded article to be deformed, a deformation state of the resin molded article by optimizing an objective function under a prescribed restraint condition and a prescribed limiting condition, using a topology optimization method dividing the resin molded article into micro regions, the restraint condition is a trend of the amount of deformation of the resin molded article, the prescribed limiting condition is a contribution rate expressing an extent to which deformation of each micro region contributes to deformation of the resin molded article, and in the optimization of the objective function optimization is performed so as to minimize rigidity of the resin molded article.

14 Claims, 12 Drawing Sheets

(56) References Cited

FOREIGN PATENT DOCUMENTS

| | | | |
|---|---|---|---|
| JP | 2004-268428 A | 9/2004 | |
| JP | 2005-169766 A | 6/2005 | |
| JP | 2005144881 A * | 6/2005 | ............ B29C 37/00 |
| JP | 2007-004238 A | 1/2007 | |
| JP | 2008-021217 A | 1/2008 | |
| JP | 2008-276662 A | 11/2008 | |

OTHER PUBLICATIONS

Jiang Bing-yan, et al. "Effect of injection molding processing parameters on light guide plate with microstructure array".

* cited by examiner

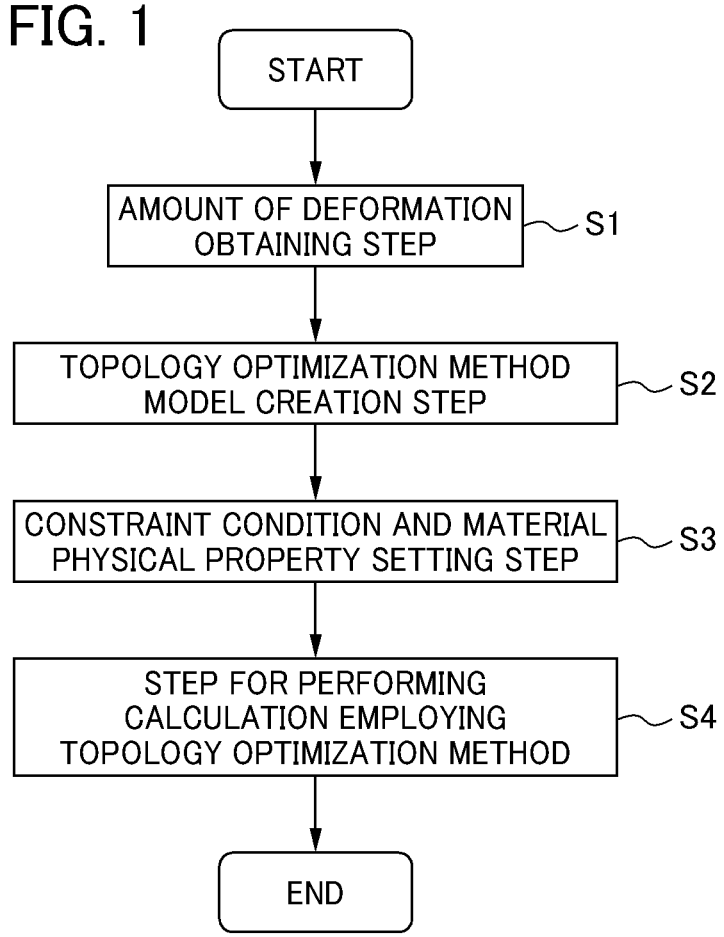

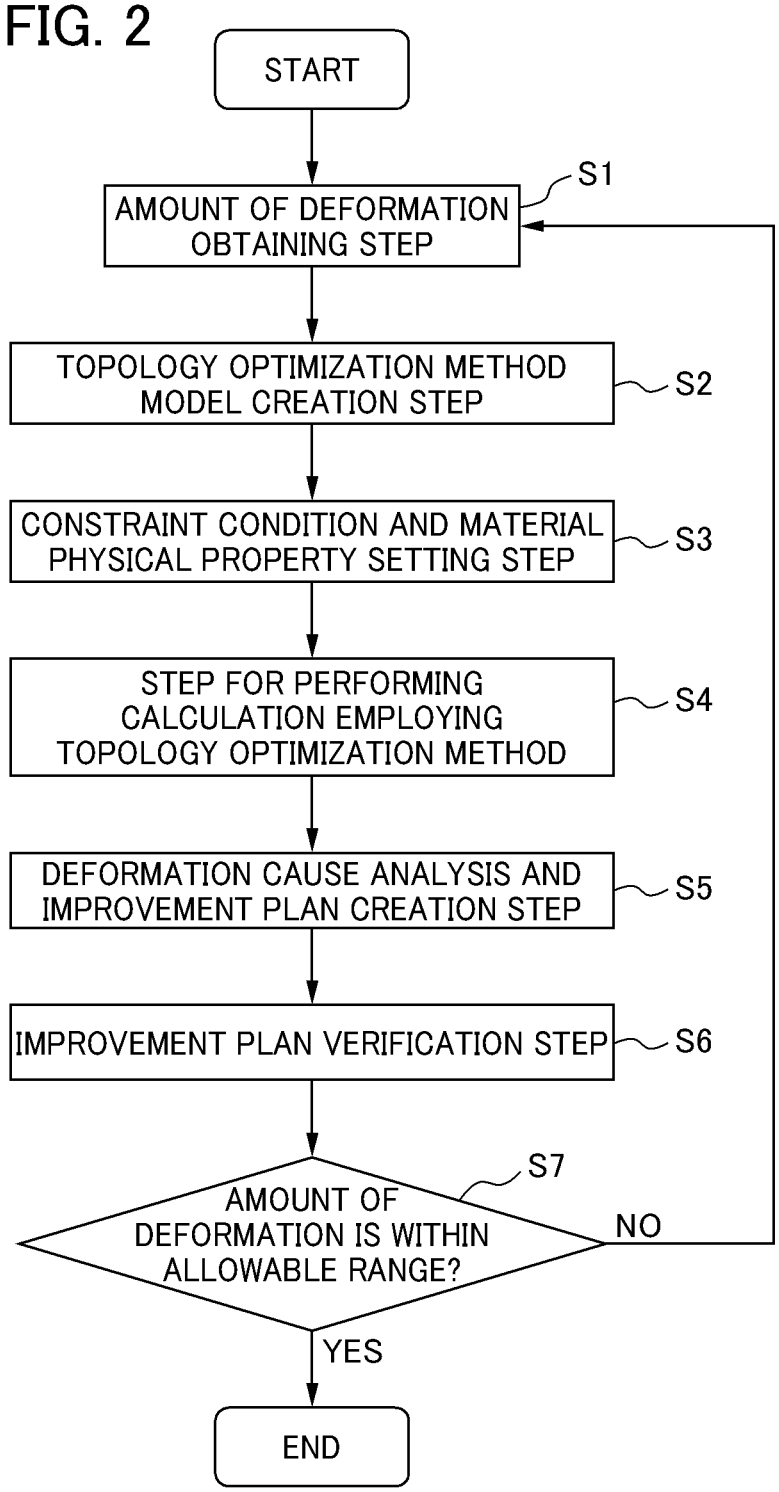

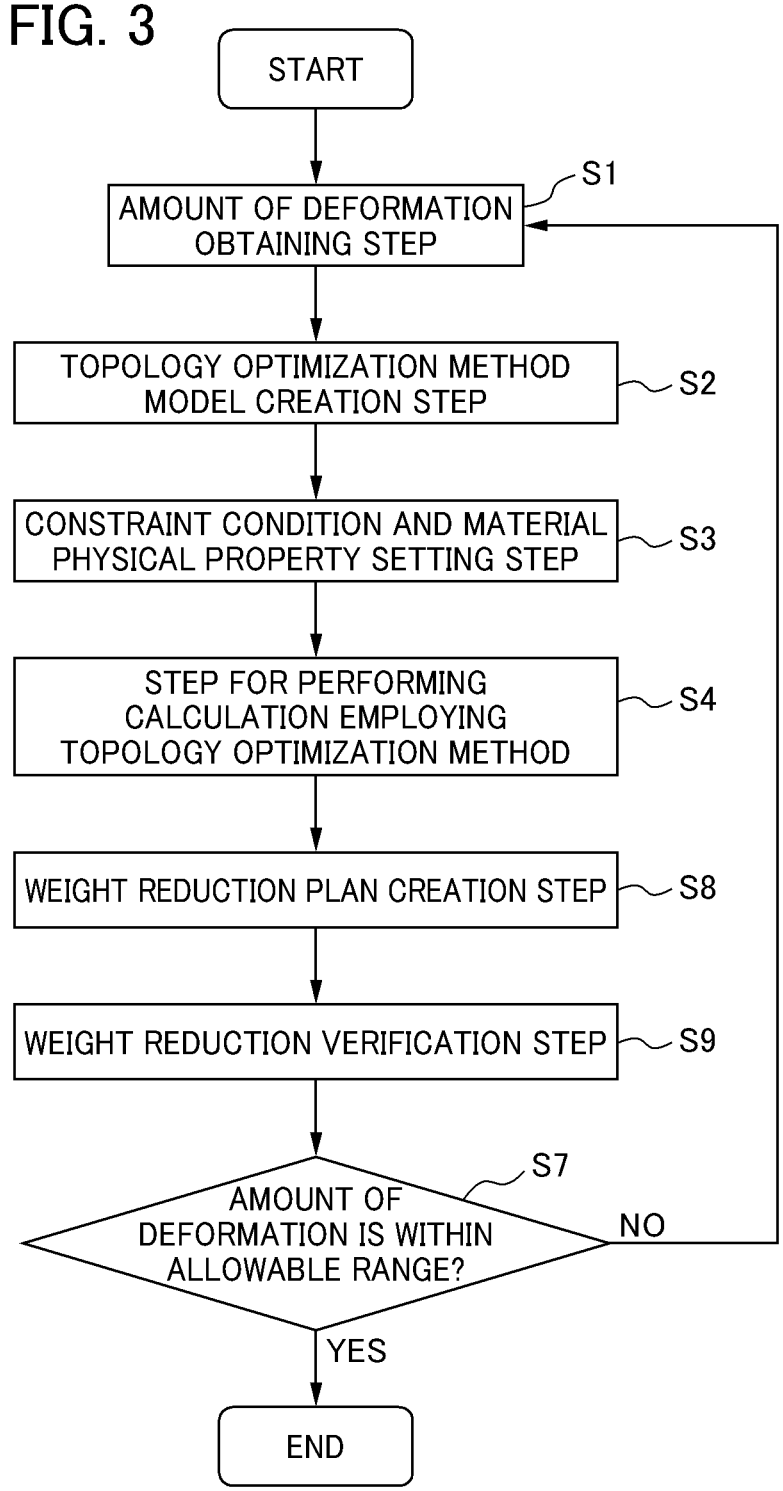

DEFORMATION STATE ANALYSIS METHOD, RESIN MOLDED ARTICLE DEFORMATION IMPROVEMENT METHOD, AND RESIN MOLDED ARTICLE WEIGHT REDUCTION METHOD

TECHNICAL FIELD

The present invention relates to a deformation state analysis method, a resin molded article deformation improvement method, and a resin molded article weight reduction method.

BACKGROUND ART

Resin molded articles obtained by processing a thermoplastic resin or a resin composition containing the thermoplastic resin to injection molding or the like have widely been used as industrial commodities. By the way, these resin molded articles often require high dimensional accuracy. The major cause of impairment of the dimensional accuracy is a defect phenomenon called warpage.

As a method for estimating the warpage, a method employing CAE (computer-aided engineering) which is injection molding using computer has been known. The CAE has been introduced into various resin molded article design sites and used for the purpose of shortening the resin molded article designing period and reducing a cost for making a trial product. For example, it is possible to consider a shape change such as addition of a rib, a change in molding condition such as a gate position and an injection rate, and a change of materials on a computer by setting a product shape, a molding condition, and a material physical property value and analyzing warpage.

In a designing stage before making a trial resin molded article, a method of deciding functions of a target product and a spec by performing CAE analyses under various conditions is generally employed in order to optimize the product shape, molding condition, and materials.

A method for deciding a shape and a molding condition considering the warpage is disclosed in Patent Documents 1 and 2 and so forth. The method described in Patent Document 1 includes analyzing a region which influences on warpage in a resin molded article by using a computer, wherein a shape model is divided into at least 2 regions; a parameter such as a thickness and a length is given to the desired regions; a warpage analysis is performed on each of the regions; detecting the amount of warpage sensitivity from each of the obtained amounts of warpage; and performing optimization so as to minimize the warpage.

Likewise, the method described in Patent Document 2 includes giving a plate thickness, a resin filling gate position, and a gate size as parameters and optimizing the parameters so as to minimize warpage by optimization calculation.

Patent Document 1: Japanese Unexamined Patent Application, Publication No. 2004-268428
Patent Document 2: Japanese Unexamined Patent Application, Publication No. 2005-169766

DISCLOSURE OF THE INVENTION

Problems to be Solved by the Invention

However, the above-mentioned methods require a long period of time for the region division and the parameterization and optimization of plate thickness, shape, gate position, and the like. In the case of changing only the plate thickness, a two-dimensional element model (shell element) makes the setting easy, but it is difficult to create a model as the two-dimensional element model in the case of a complicated shape such as a shape having a free curved surface. Further, with the two-dimensional element model, precision per se of the warpage analysis is inferior in many cases. Since an ordinary warpage analysis requires repetitive warpage analyses setting in addition to a filling analysis as well as detailed element division in order to enhance analysis precision, an analysis execution time is long. Furthermore, each of the methods requires the optimization calculation for certain numbers of regions and parameters, but only an approximate shape is obtained when the set regions are rough. In the case of using more detailed set regions, great labor and time are required for the division, and the calculation time is much increased. Thus, the cost required for the calculation for deciding the shape is largely increased.

Also, though it is possible to estimate a warpage of a product by the warpage analysis, the region on which a countermeasure such as a shape change effective for a reduction of warpage is to be performed and how the countermeasure should be performed are determined by relying on perception and experience of an engineer as a matter of fact. Though the calculation cost reduction and the designing time shortening can be attained in the methods described in Patent Documents 1 and 2 if it was possible to expect, to a certain extent, the region which is the cause of warpage and is the one where the parameter should be set, there is not any rational means or method for determining the region at present.

The present invention was accomplished in order to solve the above-described problems, and an object thereof is to provide, when creating and designing a countermeasure plan (e.g. warpage countermeasure plan) against deformation of a resin molded article, an analysis method which enables to create a more effective countermeasure plan in a short time and with a large calculation cost reduction.

Means for Solving the Problems

The inventors conducted extensive researches in order to solve the problems. As a result, the inventors accomplished the present invention based on the findings that the problems are solved by a deformation state analysis method comprising analyzing a deformation state of a resin molded article which is subject to deformation by dividing the resin molded article into minute regions and optimizing a target function under a predetermined constraint condition and a predetermined restraint condition employing a topology optimization method, wherein the predetermined constraint condition is a tendency of an amount of deformation of the resin molded article; the predetermined restraint condition is a contribution ratio which is a degree of contribution of deformation of each of the minute regions to the deformation of the resin molded article; and the optimization of the target function is performed in such a manner that a reduction in rigidity of the resin molded article is minimized. More specifically, the present invention provides the following methods.

(1) A deformation state analysis method, comprising analyzing a deformation state of a resin molded article which is subject to deformation by dividing the resin molded article into minute regions and optimizing a target function under a predetermined constraint condition and a predetermined restraint condition employing a topology optimization method, wherein the predetermined constraint condition is a tendency of an amount of deformation of the resin molded article; the predetermined restraint condition is a contribution ratio which is a degree of contribution of deformation of each of the minute regions to the deformation of the resin molded article; and the optimization of the target function is performed in such a manner that a reduction in rigidity of the resin molded article is minimized.

(2) The deformation state analysis method according to (1), wherein the deformation is derived by employing a finite element method.

(3) The deformation state analysis method according to (1), wherein the deformation is an actual measurement value.

(4) The deformation state analysis method according to any one of (1) to (3), wherein the contribution ratio deriving step is performed based on a correlation between a value obtained by multiplying the deformation of each of the minute regions by a coefficient exceeding 1 and a physical property of the material.

(5) A resin molded article deformation improvement method comprising suppressing deformation of a resin molded article by changing a shape of a range including the minute region of which the contribution ratio derived by the deformation state analysis method defined in any one of (1) to (4) is equal to or above an average value.

(6) The resin molded article deformation improvement method according to (5), comprising preliminarily deriving a plurality of relations between a mode of the shape change of the range including the minute region of which the contribution ratio is equal to or above the average value in the resin molded article and a mode of deformation of the resin molded article which is changed by the change mode and changing the shape of the range including the minute region of which the contribution ratio is equal to or above the average value based on the plurality of relations.

(7) The resin molded article deformation improvement method according to any one of (1) to (4), comprising a shape change step for changing the shape of the range including the minute region of which the contribution ratio is equal to or above the average value and a confirmation step for confirming a change state by producing a resin molded article after the shape change step, wherein, in the case where a deformation of the resin molded article is equal to or above a predetermined value, the shape change step and the confirmation step are repeated by changing the shape change mode until the deformation is equal to or below the predetermined value.

(8) A resin molded article weight reduction method comprising reducing a weight of a resin molded article by reducing at least a part of the range including the minute region of which the contribution ratio derived by the deformation state analysis method defined in any one of (1) to (4) is equal to or below the average value.

Effects of the Invention

According to the present invention, creation of a countermeasure plan (e.g. warpage countermeasure plan) against deformation of a resin molded article and designing of the resin molded article are performed in a short time, and a calculation cost required for the deformation countermeasure plan creation and the resin molded article designing is largely reduced.

BRIEF DESCRIPTION OF THE DRAWINGS

FIG. 1 is a flow chart showing one example of the deformation state analysis method of the present invention.

FIG. 2 is a flow chart showing one example of the resin molded article deformation improvement method of the present invention.

FIG. 3 is a flow chart showing one example of the resin molded article weight reduction method of the present invention.

Shown in FIG. 4 are diagrams each schematically illustrating a casing which houses a gear (casing of Reference Example 1), wherein (a) is a perspective view showing a surface side, and (b) is a perspective view showing a reverse side.

Figure 5:
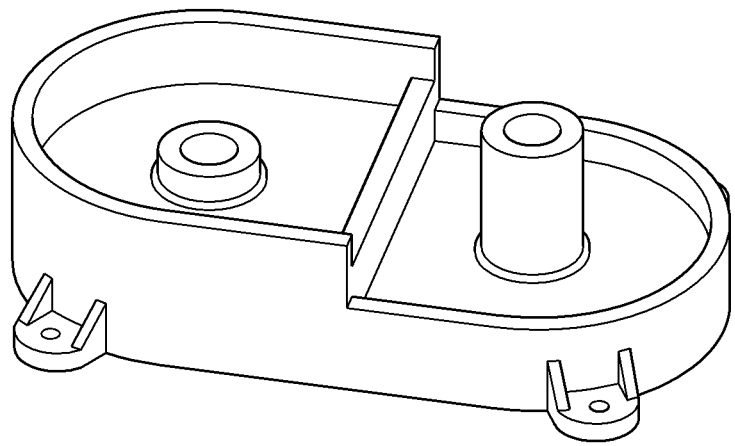

FIG. 5 is a diagram schematically showing a casing of Comparative Example 1.

Figure 6A:
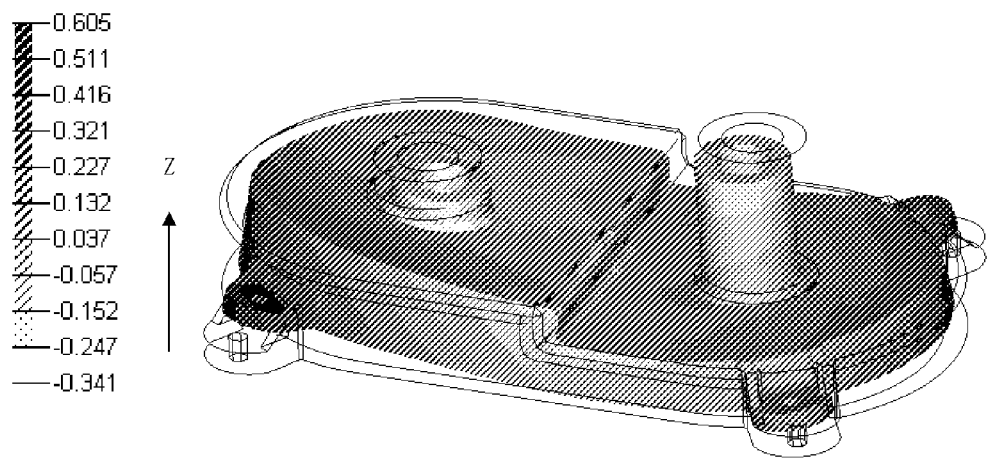
Figure 6B:
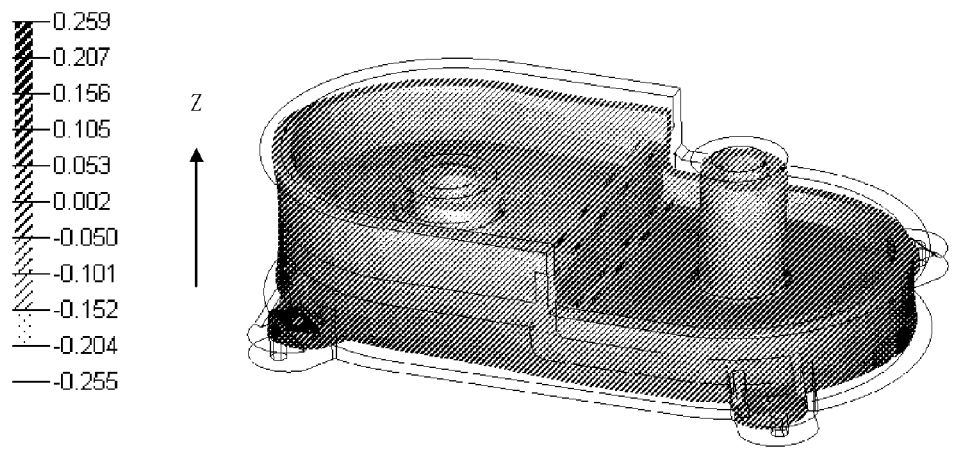

Shown in FIG. 6 are diagrams each illustrating a deformation in a direction (direction Z) perpendicular to an edge face of a bottom of a casing which houses a gear, the deformation being derived by an injection molding CAE calculation, wherein (a) is a result of the casing of Reference Example 1, and (b) is a result of the casing of Comparative Example 1.

Figure 7A:
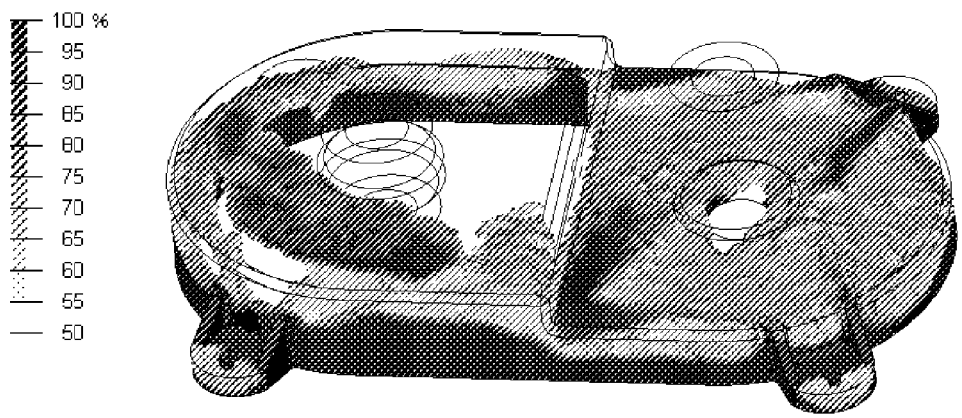
Figure 7B:
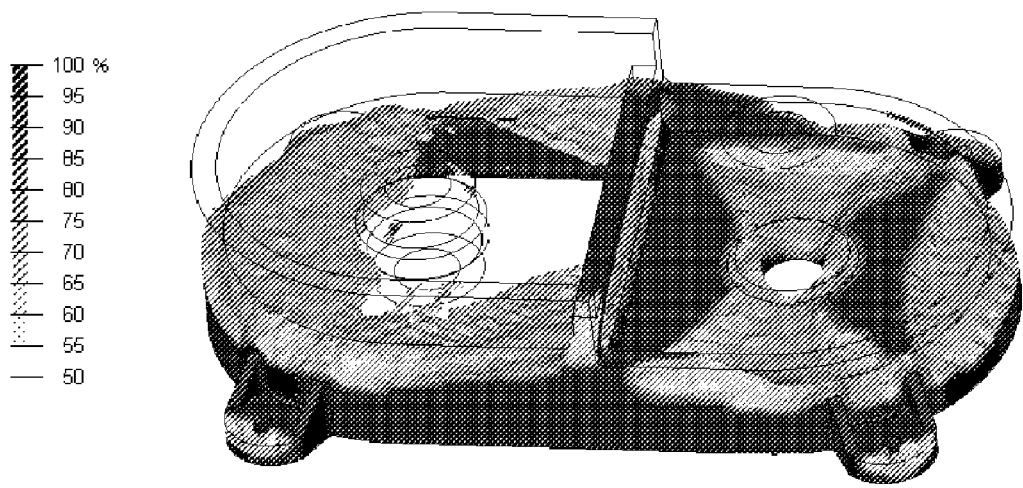

Shown in FIG. 7 are diagrams each illustrating a distribution of contribution ratios each indicating a degree of contribution of deformation of each of minute regions to deformation of a resin molded article, wherein (a) is the distribution of contribution ratios of Reference Example 1, and (b) is the distribution of contribution ratios of Comparative Example 1.

Figure 8:
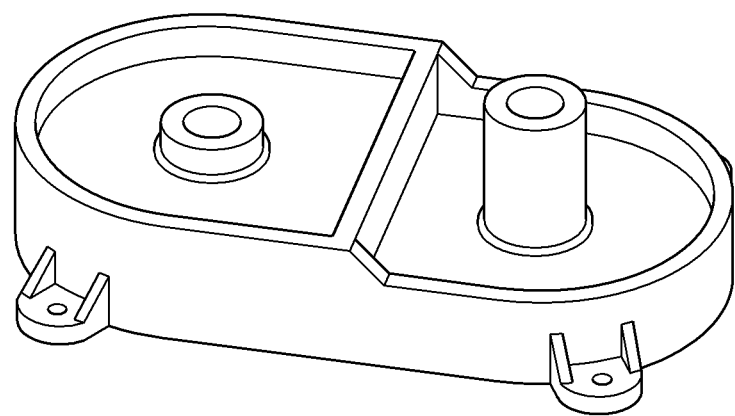

FIG. 8 is a diagram schematically showing a casing of Example 1.

Figure 9:
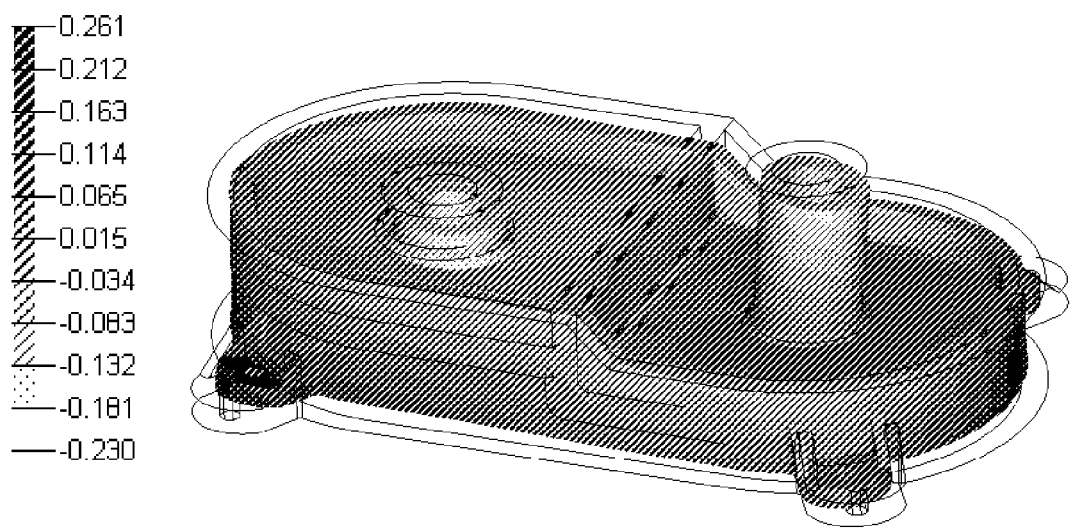

FIG. 9 is a diagram showing a deformation in a direction (direction Z) perpendicular to an edge face of a bottom of the casing of Example 1, the deformation being derived by the injection molding CAE calculation.

Shown in FIG. 10 are diagrams each schematically illustrating a cubic container, wherein (a) is a plan view, (b) is an AA sectional view, and (c) is a BB sectional view.

Figure 11:
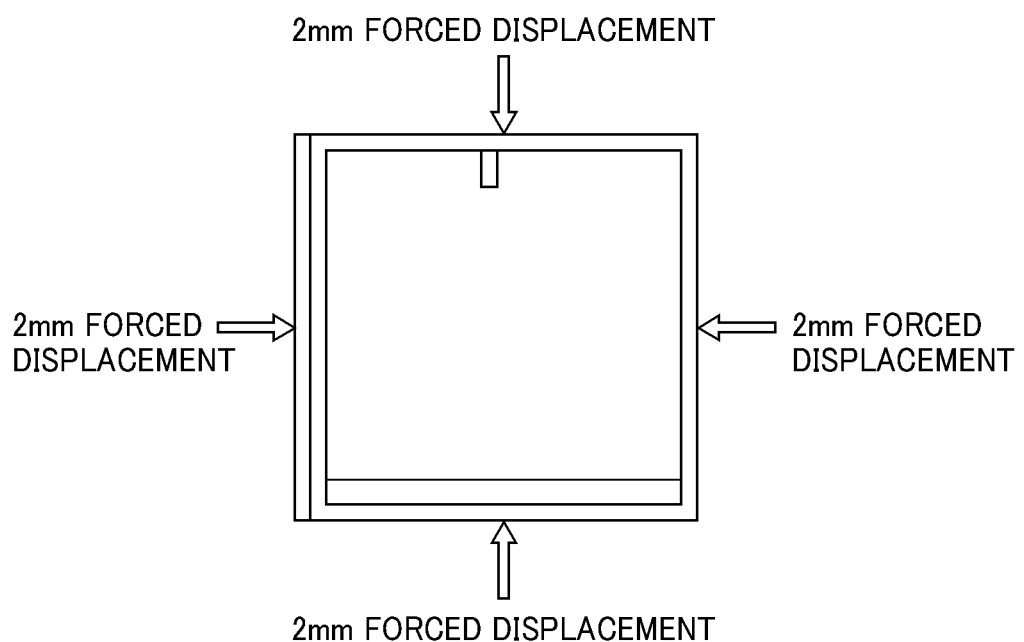

FIG. 11 is a diagram showing a tendency of a deformation which is a constraint condition when deriving the distribution of contribution ratios.

Figure 12A:
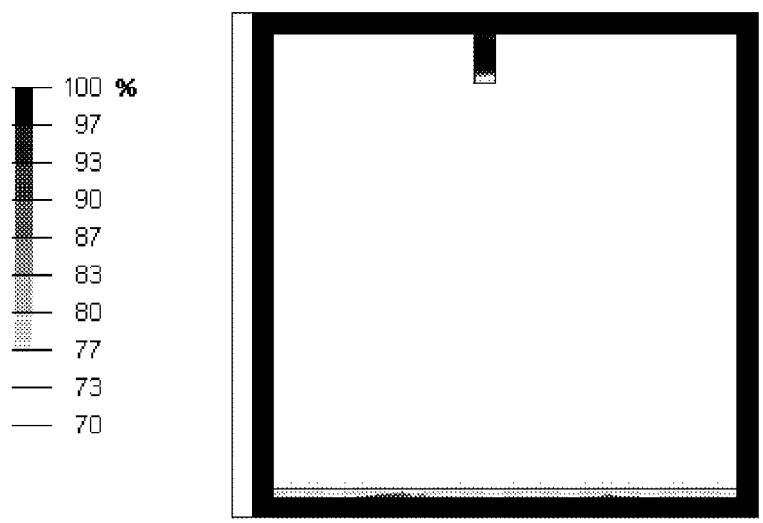
Figure 12B:
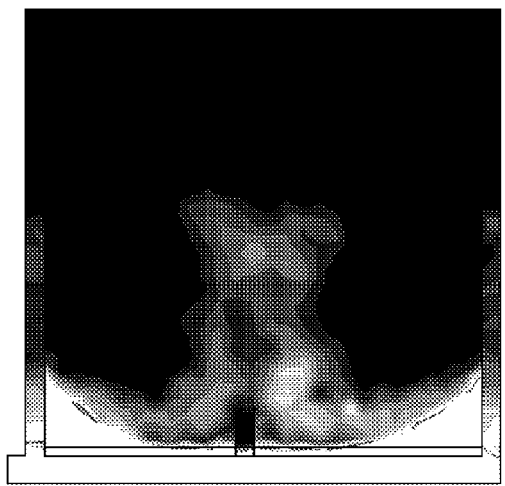
Figure 12C:

Shown in FIG. 12 are diagrams each illustrating a distribution of contribution ratios each indicating a degree of contribution of deformation of each of minute regions to deformation of a resin molded article, wherein (a) is the distribution of contribution ratios in a plan view, (b) is the distribution of contribution ratios in the AA section of FIG. 10, and (c) is the distribution of contribution ratios in the BB section.

PREFERRED MODE FOR CARRYING OUT THE INVENTION

Hereinafter, embodiments of the present invention will be described. It should be noted that the present invention is not limited to the following embodiments.

Deformation State Analysis Method

One example of the deformation state analysis method of the present invention will be described by using the flowchart of FIG. 1. As shown in the flowchart of FIG. 1, the deformation state analysis method of the present embodiment include a step for obtaining an amount of deformation (S1), a step for creating a model for a topology optimization method (S2), a step for setting a restraint condition and a physical property of a material (S3), and a step for performing calculation employing the topology optimization method (S4).

[Amount of Deformation Obtaining Step (S1)]

In the present embodiment, the constraint condition used in the step for performing calculation employing the topology optimization method (S4) is a tendency of an amount of deformation (a distribution indicating the tendency of deformation) of a resin molded article. The tendency of the amount of deformation means a tendency of deformation, and examples other than the amount of deformation include a value obtained by multiplying the amount of deformation by a coefficient. In this step, the amount of deformation is derived in order to obtain the amount of deformation tendency.

A method for deriving the amount of deformation is not particularly limited, and an amount of deformation derived by a CAE analysis or the like may be used as the amount of deformation. Alternatively, an amount of deformation derived by an actual measurement may be used.

When a deformation state of the resin molded article is reproduced by the distribution of deformation or the tendency of deformation, a contribution ratio described later in this specification becomes a constant value irrespective of the amount of deformation derived by the analysis. Therefore, a more accurate analysis is attained irrespective of analysis accuracy of an amount of deformation absolute value obtained by the CAE analysis.

Particularly, when the amount of deformation tendency is represented by using a value obtained by multiplying the amount of deformation by a coefficient exceeding 1, the deformation tendency becomes clearer. Accordingly, even when the tendency contains a subtle change, the subtle change is considered, and therefore the accuracy of the analysis is increased.

The deformation of the resin molded article in the present invention includes both of the case in which the resin molded article is deformed by an external force applied to the resin molded article and the case in which the resin molded article is deformed by a shrinkage and expansion of a resin contained in the resin molded article (warpage, etc.).

Also, the analysis of the deformation state may be performed on an entire body of the resin molded article or on a part of the resin molded article. In the case of performing the partial analysis, a tendency of an amount of deformation of the part is derived, and then the following steps are performed.

[Topology Optimization Method Model Creation Step (S2)]

The topology optimization method model creation step (S2) includes creating a model required for executing the topology optimization method by dividing the resin molded article into minute regions. For example, a shape of the resin molded article is input to a personal computer or the like using a CAD interface or the like, or a model range is set by creating a shape of the resin molded article using a CAD system. Next, the resin molded article is divided into a plurality of regions by performing element division such as a finite element method using an element division preprocessor or the like to create a model.

As a shape of an element, a primary element or a secondary element of a tetrahedron, a primary element or a secondary element of a hexahedron, or the like may be selected. In the case of detecting the amount of deformation by the analysis in the amount of deformation obtaining step (S1), it is necessary to select the element depending on a spec of finite element method software, a spec of a computer system performing the calculation, and a calculation cost. Also, it is difficult to achieve high calculation accuracy when the number of element divisions is not satisfactorily large. On the other hand, since it is necessary to repeat the calculation for a plurality of times in the finite element model used for the topology optimization, it is desirable that the number of elements is small. Accordingly, a preferred number of divisions is selected considering the calculation accuracy, the calculation time, and so forth.

The example of using the finite element model has been described above as the model for the calculation employing the topology optimization method. However, a result of a CAE analysis such as a finite difference analysis and a meshless analysis may be used for obtaining the above-described model.

[Restraint Condition and Material Physical Property Setting Step (S3)]

In the restraint condition and material physical property setting step (S3), a specific threshold value is set for a contribution ratio (restraint condition in the present embodiment) which indicates a degree of contribution of deformation of each of the minute regions to the deformation of the resin molded article. Further, a physical property value to be used for the calculation of the contribution ratio in the step for performing calculation employing the topology optimization (S4) is set. As used herein, the contribution ratio is [1−(volume which satisfies the restraint condition and can be deleted/volume of an original shape)×100(%).

The specific threshold value of the contribution ratio is not particularly limited and may appropriately be set depending on desired accuracy of the analysis and the like. For example, when the threshold value is too high, it is difficult to highly accurately analyze the deformation state since the contribution ratio can be determined to be equal to or lower than the threshold value despite the fact that the deformation of the minute region contributes to the deformation. On the other hand, when the threshold value is too low, it is difficult to highly accurately analyze the deformation state, too, since the contribution ratio can be determined to be equal to or higher than the threshold value despite the fact that the deformation of the minute region actually contributes little to the deformation. The threshold value which is capable of distinguishing the deformation which contributes to the actual deformation from the one which does not contribute to the actual deformation is varied depending on the type of the material forming the resin composition.

Also, the physical property required for the contribution ratio calculation is the one which relates to the deformation of the resin molded article such as a Poisson's ratio and an elastic modulus. Physical properties other than the Poisson's ratio and elastic modulus may be taken into consideration.

In the case where the deformation state of the resin molded article is reproduced by the deformation distribution or the deformation tendency as described above, the contribution ratio described later in this specification becomes a constant value irrespective of the amount of deformation obtained by the analysis. Therefore, even when the elastic modulus is different from an actual value, it is possible to execute a more correct deformation countermeasure plan. However, in the case where the material used has an elastic modulus which is anisotropic or is with distribution or the like due to influences of a higher structure and a filler, it is desirable to consider the anisotropy, distribution, and the like and to render the elastic modulus to the physical property value.

[Step for Performing Calculation Employing Topology Optimization Method (S4)]

In the step for performing calculation employing the topology optimization method, the tendency of the amount of deformation obtained by the amount of deformation obtaining step (S1) is applied to the model created by the topology optimization method model creation step (S2), and optimization is performed in such a manner that a target function is minimized using the physical property parameters set as described above and using the threshold value of the contribution ratio as the restraint condition. In the present invention, the optimization is performed so as to minimize a reduction in rigidity of the resin molded article.

In the foregoing, as the specific calculation method for the topology optimization, a homogenization design method (HDM), a density approach, a genetic algorithm, an simulated annealing method, a cell-automaton method, and the like based on the conventional mathematical programming are employed. It is possible to execute these methods by using commercially available software such as OPTISTRUCT manufactured by Altair, OPTISHAPE manufactured by Quint Corporation, and TOSCA manufactured by FE-design GmbH.

In the present embodiment, the threshold value of the contribution ratio is used as the restraint condition, and to what degree the threshold value is satisfied and to what degree the threshold value is not satisfied are evaluated in addition to evaluation of whether or not the threshold value is satisfied. By performing the evaluations, the contribution ratio is more exactly determined to enable a more correct deformation state analysis. Further, in the case of evaluating to what degree the threshold value is satisfied and to what degree the threshold value is not satisfied by the above-described calculation, it is possible to confirm the contribution ratio in each of the minute regions irrespective of a value of the threshold value, and, therefore, it is possible to arbitrarily select the value of the threshold value.

By deriving the contribution ratio of each of the minute regions as described above, a distribution of the contribution ratios in the resin molded article is derived. As described above, the contribution ratio indicates a degree of contribution of deformation of each of the minute regions to the deformation of the resin molded article. The region having a large contribution ratio is a part which largely influences on the deformation of the resin molded article, and the region having a small contribution ratio is a part which does not influence on the deformation of the resin molded article. Therefore, it is possible to readily distinguish the region which is largely involved in the deformation of the resin molded article from the region which is little involved in the deformation of the resin molded article by deriving the distribution of contribution ratios.

Even in the case of evaluating whether the value is less than the threshold value or equal to or above the threshold value only, insofar as the setting of the threshold value is proper, it is possible to confirm that the region which is evaluated to be equal to or less than the threshold value by the above calculation is the region which is little involved in the deformation of the resin molded article, and it is possible to confirm that the region which is evaluated to be equal to or more than the threshold value by the above calculation is the region which is largely involved in the deformation of the resin molded article. Therefore, in the above-described case, too, it is possible to determine the distributions in the resin molded article of the region which is involved in the deformation and the region which is not involved in the deformation of the resin molded article.

Alternatively, to what degree the threshold value is not satisfied may be evaluated by the calculation only when the value is less than the threshold value, or how much larger the value is than the threshold value may be evaluated by the calculation only when the value is equal to or larger than the threshold value. As described above, it is also possible to evaluate the contribution ratio of a part in detail.

Resin Molded Article Deformation Improvement Method

The method for improving deformation of a resin molded article of the present invention enables to prevent deformation by changing a shape of a resin molded article in the case where the resin molded article can be deformed by an external force and to prevent deformation by changing a shape of a resin molded article in the case where the deformation is caused by expansion and shrinkage of the resin molded article, such as warpage.

Particularly, the resin molded article deformation improvement method of the present invention is capable of performing the deformation improvement since the method is performed by using the analysis result obtained by the above-described deformation state analysis method. More specifically, by using the analysis result, a part which is necessarily modified for the improvement in the resin molded article is readily determined.

Hereinafter, one example of the resin molded article deformation improvement method of the present invention will be described by using the flowchart shown in FIG. 2. As shown in the flowchart of FIG. 2, the resin molded article deformation improvement method of the present embodiment includes an amount of deformation obtaining step (S1), a topology optimization method model creation step (S2), a restraint condition and material physical property setting step (S3), a step for preforming calculation employing the topology optimization method (S4), a step for analyzing a cause of deformation and creating an improvement plan (S5), and a step for verifying the improvement plan (S6).

Here, the amount of deformation obtaining step (S1), the topology optimization method model creation step (S2), the restraint condition and material property setting step (S3), and the step for performing calculation employing the topology optimization method (S4) are the same as those described in the deformation state analysis method, description of these steps are not repeated below.

[Deformation Cause Analysis and Improvement Plan Creation Step (S5)]

In the deformation cause analysis, a part which is the cause of the deformation is specified based on the analysis result obtained by the deformation state analysis method. As described above, since the part largely involved in the deformation is indicated in the analysis result, the largely involved region (generally, a group of a plurality of minute regions) is specified as a region which is likely to be the cause of the deformation. Subsequently, in the specified regions, the part to be the cause of the deformation is assumed considering a thickness, a shape, and the like of the resin molded article in the region. The term "part largely involved in the deformation" means in general the range inducing the minute regions of each of which the contribution ratio which is derived by the deformation state analysis method is equal to or above the average value.

After assuming the part to be the cause of the deformation, an improvement method for suppressing the deformation is considered. Since the region which contributes to the deformation is easily identified according to the present invention, it is possible to easily decide a shape which suppresses the deformation by modifying the region which contributes to the deformation. In the present embodiment, a shape of the range including the minute region of which the contrition ratio is equal to or more than the average in the resin molded article is changed.

To what shape the range is changed may be decided based on the common general technical knowledge or may be decided based on a relationship between a tendency of deformation of the resin molded article which was examined in the past and an improvement plan. Particularly, in the improvement of the deformation of the resin molded article which was examined in the past, it is preferable to preliminarily derive a plurality of relations between a mode of the shape change of the range including the minute region of which the contribution ratio is equal to or above the average in the resin molded article and a mode of deformation of the resin molded article which is changed by the change mode and to decide to what shape the range is changed based on the plurality of relations. The above decision making is preferred since it highly possibly attains the improvement.

[Improvement Plan Verification Step (S6)]

In the improvement plan verification step, it is verified whether or not the improvement plan created in the deformation cause analysis and improvement plan creation step (S5) is a proper improvement plan. For example, the verification step is performed by employing a method of confirming an effect of the improvement by performing an analysis such as a CAE analysis on a modified resin molded article and a method of confirming an effect of deformation suppression in a resin molded article by performing actual molding.

In the case where an amount of deformation of the resin molded article is within an allowable range as a result of the verification, the deformation improvement method of the present invention is brought to an end. Since the allowable amount of deformation range is varied depending on the shape, usage, and so forth of the resin molded article, a desired range is appropriately set depending on the situation.

In the case where the amount of deformation of the resin molded article exceeds the allowable range as a result of the verification, the processing returns to the topology optimization method model creation step (S2) to repeat the steps from the topology optimization method model creation step (S2) to the improvement plan verification step (S6). When the amount of deformation is reduced to be within the allowable range, the improvement method of the present invention is brought to an end.

Resin Molded Article Weight Reduction Method

The resin molded article weight reduction method of the present invention is a method of reducing a weight by removing an extra part from a resin molded article without deforming the resin molded article.

Particularly, since the resin molded article weight reduction method of the present invention uses the analysis result obtained by the above-described deformation state analysis method, it is possible to largely suppress generation of deformation which is otherwise caused by the weight reduction of the resin molded article. More specifically, since the region which contributes to the deformation in the resin molded article is made clear by using the analysis result, the region where deformation occurs and the region where no deformation occurs in the resin molded article after the removal are clearly distinguished from each other, and possibility of deformation caused by the weight reduction in the resin molded article is suppressed.

Hereinafter, one example of the method of reducing a weight of a resin molded article of the present invention will be described by using the flowchart shown in FIG. 3. As shown in the flowchart of FIG. 3, the resin molded article weight reduction method of the present embodiment includes an amount of deformation obtaining step (S1), a topology optimization method model creation step (S2), a restraint condition and material physical property setting step (S3), a step for performing calculation employing the topology optimization method (S4), a weight reduction plan creation step (S7), and a weight reduction verification step (S8).

Since the amount of deformation obtaining step (S1), the topology optimization method model creation step (S2), the restraint condition and material property setting step (S3), and the step for performing calculation employing the topology optimization method (S4) are the same as those described in the deformation state analysis method, description of these steps are not repeated below.

[Weight Reduction Plan Creation Step (S7)]

From the analysis result obtained by the deformation state analysis method, a region (generally, a group of a plurality of minute regions) largely involved in the deformation of the resin molded article and a region less involved in the deformation are distinguished from each other with high accuracy. By utilizing the above-described feature, a weight reduction plan for reducing at least a part of the region which is less involved in the deformation of the resin molded article is created. The region which is largely involved in the deformation generally means the range inducing the minute regions of each of which the contribution ratio derived by the deformation state analysis method is equal to or above the average value.

[Weight Reduction Verification Step (S8)]

In the weight reduction verification step, it is verified whether or not the weight reduction plan created in the weight reduction plan creation step (S7) is a proper weight reduction plan. For example, the weight reduction verification step (S8) may be performed by a method of confirming whether or not deformation is generated due to the weight reduction in the resin molded article from which a part is reduced according to the weight reduction plan by performing an analysis such as a CAE analysis or a method of confirming whether or not deformation is generated in the resin molded article by actually performing molding.

In the case where the amount of deformation of the resin molded article is within an allowable range, the resin molded article weight reduction method of the present invention is brought to an end. Since the allowable amount of deformation range is varied depending on the shape, usage, and so forth of the resin molded article, a desired range is appropriately set depending on the situation.

In the case where the amount of deformation of the resin molded article exceeds the allowable range as a result of the verification, the processing returns to the topology optimization method model creation step (S2) to repeat the steps from the topology optimization method model creation step (S2) to the improvement plan verification step (S8). When the amount of deformation is reduced to be within the allowable range, the weight reduction method of the present invention is brought to an end.

EXAMPLES

Though the present invention will hereinafter be described in more details by using Examples and Comparative Examples, the present invention is not limited to Examples.

Figure 4A:
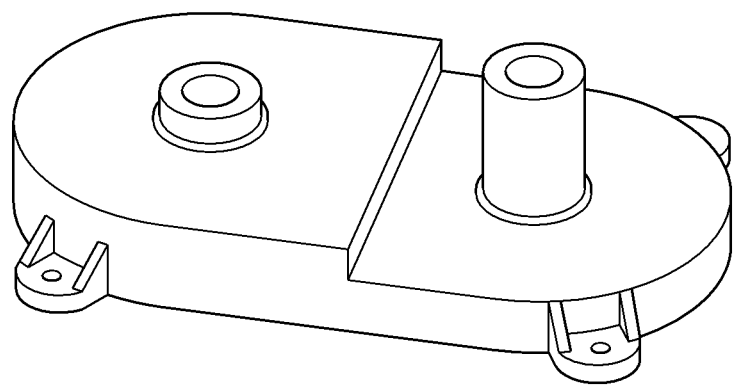
Figure 4B:
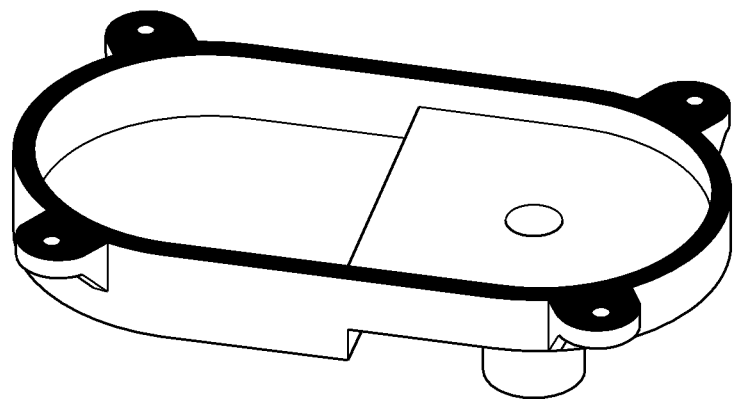

Shown in FIG. 4 is a casing (Reference Example 1) for housing a gear which is schematically illustrated. FIG. 4(a) is a perspective view showing an upper surface side, and FIG. 4(b) is a perspective view showing a bottom surface side. In the casing of Reference Example 1, a circular edge face (portion which is painted black in the drawing) shown in FIG. 4(b) is required to be a flat face. Here, the casing is the resin molded article, and a thermoplastic resin forming the resin molded article has an elastic modulus of 2500 MPa and a Poisson's ratio of 0.35.

For the purpose of preventing the flatness of the portion indicated in FIG. 4(b) from being impaired due to warpage caused in the gear casing shown in FIG. 4, a casing in which a rib is formed on an edge of the upper surface (casing of Comparative Example 1) was produced. A perspective view of the upper surface side of the casing of Comparative Example 1 is shown in FIG. 5.

By setting a direction perpendicular to the edge face as a direction Z, warpage in the direction Z of each of the casing of Reference Example 1 and the casing of Comparative Example 1 was detected by an injection molding CAE calculation. The results are shown in FIG. 6.

For the casing of Reference Example 1 and the casing of Comparative Example 1, a model for the topology optimization method was created in accordance with an ordinary warpage countermeasure. By using the model, a target function was optimized in such a manner as to minimize a reduction in rigidity of the resin molded article by using a amount of deformation described in FIG. 6 as the constraint condition and using a contribution ratio indicating a degree of contribution of deformation of each of minute regions to deformation of the resin molded article as the restraint condition. A distribution of the contribution ratios was derived by a method of indicating parts in each of which the contribution ratio is 50% or more with a scale in increments of 5%. The results of the derivation are shown in FIG. 7.

According to the distribution of contribution ratios, the region contributing to the deformation in the casing of Reference Example 1 and the region which does not contribute to the deformation are distinguished from each other. Also, from the distribution of the contribution ratios of the casing of Comparative Example 1, it was confirmed that the rib for warpage suppression is not effective for the warpage suppression.

According to the contribution ratio distribution of FIG. 7, opposite ends at the bottom of a step existing on the surface of the casing locally have the high contribution ratios. Therefore, a casing of Example 1 in which a triangular rib is added to the step was produced. Also, in the casing of Example 1, the rib is provided in such a manner as to enclose an edge of the upper surface. In FIG. 8, the casing of Example 1 is schematically illustrated.

By setting a direction perpendicular to the edge face as a direction Z, warpage in the direction Z of the shape of the improvement plan of FIG. 8 was detected by the injection molding CAE calculation. The result is shown in FIG. 9. As is apparent from FIG. 9, the improvement in warpage was confirmed.

Also, each of an amount of warpage of the casing of Reference Example 1, an amount of warpage of the casing of Comparative Example 1, an amount of warpage of the casing of Example 1 was derived from (maximum value of warpage in direction Z)–(minimum value of warpage in direction Z). Further, each of a volume of the casing of Reference Example 1, a volume of the casing of Comparative Example 1, and a volume of the casing of Example 1 was detected by using a function incorporated into the CAD software. The results of amounts of warpage and volumes are shown in Table 1.

TABLE 1

|  | Reference Example 1 | Comparative Example 1 | Example 1 |
| --- | --- | --- | --- |
| Amont of warpage (mm) | 0.95 | 0.51 | 0.49 |
| Volume (cm³) | 24.7 | 31.1 | 29.2 |

The reduction of amount of warpage Example 1 is similar to Comparative Example 1 as compared to Reference Example 1. Also, the volume of Example 1 is reduced as compared to Comparative Example 1. From the results shown in the table, the effective warpage countermeasure plan is designed while reducing the volume (or in such a manner as to reduce an increase in volume) according to the method of the present invention.

Figure 10A:
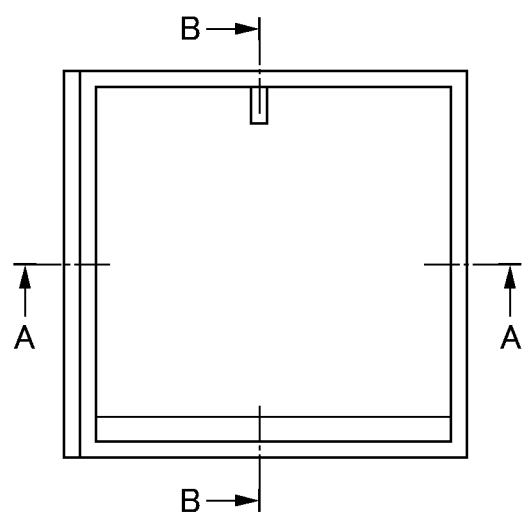
Figure 10B:
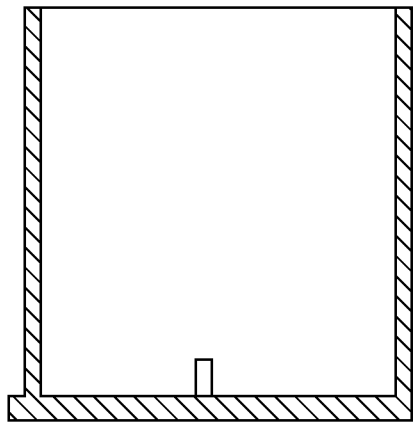
Figure 10C:
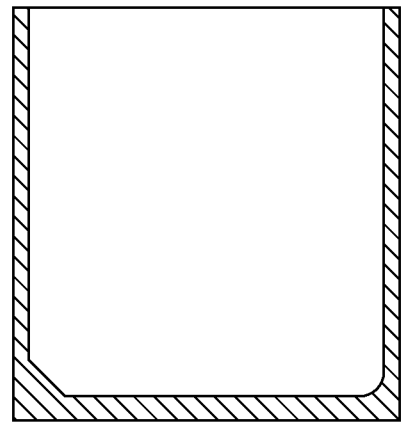

Subsequently, evaluation of a cubic container shown in FIG. 10 was performed. FIG. 10(a) is a plan view, FIG. 10(b) is an AA sectional view, and FIG. 10(c) is a BB sectional view.

It is known that, in the case of a cubic container, a wall surface of the box warps toward the inside (for example, see "Investigation into Influences of Mold Temperature Control Designing Imparted to Warpage"; Takahashi, Sekino, and Kobayashi; Journal of the Japan Society of Polymer Processing '96; P 145-P 146; 1996). Accordingly, in order to suppress the above-described deformation in the container shown in FIG. 10, a contact point between an inner bottom surface and one of the inner wall surfaces of the container was formed in an arc shape, a rib extending in such a manner that a bottom surface was projected from a boundary between an outer bottom surface and a predetermined bottom surface, and a triangular rib existing over the inner bottom surface and one of the inner wall surfaces were formed.

Regarding the container shown in FIG. 10, based on the description of the above-mentioned publication and the like, the target function was optimized in such a manner as to minimize a reduction in rigidity of the resin molded article by using the deformation amount shown in FIG. 11 as the constraint condition and the contribution ratio indicating a degree of contribution of deformation of each of the minute regions to the deformation of the resin molded article. A distribution of the contribution ratios was derived by a method of indicating parts in each of which the contribution ratio is 50% or more with a scale in increments of 3% or 4%. The result of derivation is shown in FIG. 12.

Each of the outer rib and the inner arc shaped part has the contribution ratio of 50% or less. In contrast, the portion of the triangular rib has the contribution ratio of 90% or more. Degrees of deformation were confirmed by actually producing a cubic molded article in which only the outer rib was formed, a cubic molded article in which only the arc-shaped bottom was formed, and a cubic molded article in which only the triangular rib was formed. As expected above, only the cubic molded article in which the triangular rib was formed was suppressed in deformation.

The invention claimed is:

1. A method of analyzing a deformation state of a resin molded article, comprising:
   dividing the resin molded article into micro regions; and
   optimizing an objective function using a topology optimization method under a prescribed constraint condition and a prescribed restraint condition, wherein the prescribed constraint condition is a trend of amounts of deformation of the resin molded article, the prescribed restraint condition is a contribution rate expressing an extent to which deformation of each micro region contributes to deformation of the resin molded article, the contribution rate is (1−(volume which satisfies the restraint condition and can be deleted/volume of an original shape)×100(%)), and the optimization of the objective function optimization is performed so as to minimize reduction in rigidity of the resin molded article.

2. The method according to claim 1, wherein the amount of deformation is derived using a finite element method.

3. The method according to claim 1, wherein a value computed by multiplying the amount of deformation of each micro region by a coefficient exceeding 1 is used as the amount of deformation of the resin molded article.

4. The method according to claim 1, further comprising modifying a shape of a range including a micro region where the contribution rate is greater than or equal to an average value.

5. The method according to claim 4, further comprising:

preliminarily deriving a plurality of relations between a mode of modifying a shape of a range including a micro region where the contribution rate in the resin molded article is greater than or equal to an average value, and a mode of deformation of the resin molded article is changed by the mode of modifying, wherein modifying a shape of a range including a micro region wherein the contribution rate is greater than or equal to an average value is wherein a shape of a range including a micro region wherein the contribution rate is greater than or equal to an average value is modified based on the plurality of relations.

6. The method according to claim 1, further comprising:

modifying a shape of a range including a micro region where the contribution rate is greater than or equal to an average value; and confirming a deformation state by producing a resin molded article after modifying a shape of a range including a micro region where the contribution rate is greater than or equal to an average value, wherein, when an amount of deformation of the resin molded article is greater than or equal to a predetermined value, a mode of modifying a shape is changed and modifying the shape and the step of confirming the deformation state are repeated until the amount of deformation is lower than or equal to the predetermined value.

7. The method according to claim 1, wherein a weight of the resin molded article is reduced by reducing at least a part of a range including a micro region where the contribution rate is greater than or equal to an average value.

8. A method of producing a resin molded article, comprising:

analyzing a deformation state of a resin molded article according to the method of claim 1;

selecting a shape of a range including a minute region of the resin molded article in which the contribution rate is equal to or above a preselected value; and producing the resin molded article having the selected shape.

9. A method for improving deformation of a resin molded article, comprising:

dividing a resin molded article to be deformed into micro regions;

deriving a contribution rate expressing an extent to which deformation of each micro region contributes to deformation of the resin molded article using a trend of amounts of deformation of the resin molded article as a constraint condition in performing shape modification for minimizing reduction in rigidity of the resin molded article by using a structure analysis method;

modifying a shape of the resin molded article so that at least a group of micro regions where the contribution rates are at least greater than or equal to a predetermined threshold is included; and confirming a trend of amounts of deformation of the modified resin molded article, wherein the contribution rate is (1−(volume which satisfies the restraint condition and can be deleted/volume of an original shape)× 100(%)), and wherein when the trend of amounts of deformation exceeds a predetermined allowable range, modifying the shape and confirming the trend of amounts of deformation are repeated until the trend of amounts of deformation is within the predetermined allowable range.

10. The method according to claim 9, wherein the constraint condition is a trend of amounts of deformation by actual measurement of the resin molded article.

11. The method according to claim 9, wherein a value computed by multiplying the amount of deformation of the resin molded article by a coefficient exceeding 1 is used as the trend of amounts of deformation of the resin molded article.

12. A method of producing a resin molded article, comprising:

improving deformation of the resin molded article according to the method of claim 9; and producing the resin molded article having said shape and having the amount of deformation within the predetermined allowable range.

13. A method of reducing a weight of a resin molded article, the method comprising:

dividing a resin molded article to be deformed into micro regions;

deriving a contribution rate expressing an extent to which deformation of each micro region contributes to deformation of the resin molded article, by using a trend of amounts of deformation of the resin molded article as a constraint condition, in performing shape modification for minimizing reduction in rigidity of the resin molded article by using a structure analysis method;

reducing a weight of the resin molded article by leaving a group of micro regions where the contribution rates exceed a predetermined threshold and reducing at least a part of the group of micro regions where the contribution rates are less than the threshold; and confirming a trend of amounts of deformation of the resin molded article whose weight has been reduced, wherein the contribution rate is (1−(volume which satisfies the restraint condition and can be deleted/ volume of an original shape)×100(%)), and wherein when the trend of amounts of deformation exceeds a predetermined allowable range, reducing the weight and confirming a trend of amounts of deformation are repeated until the trend of amounts of deformation is within the predetermined allowable range.

14. A method of producing a resin molded article, comprising:

reducing the weight of a resin molded article according to the method of claim 13; and producing the resin molded article having said weight and having the amount of deformation within the predetermined allowable range.

* * * * *